(12) United States Patent
Jiang et al.

(10) Patent No.: US 9,761,897 B2
(45) Date of Patent: Sep. 12, 2017

(54) FUEL CELL DURABILITY BY ORTHOGONALLY ORIENTED ANISOTROPIC EXTERNAL REINFORCE LAYERS

(75) Inventors: Ruichun Jiang, Rochester, NY (US); Matthew Dioguardi, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 572 days.

(21) Appl. No.: 13/415,113

(22) Filed: Mar. 8, 2012

(65) Prior Publication Data
US 2013/0236810 A1 Sep. 12, 2013

(51) Int. Cl.
*H01M 8/1004* (2016.01)
*H01M 8/1018* (2016.01)

(52) U.S. Cl.
CPC .. *H01M 8/1004* (2013.01); *H01M 2008/1095* (2013.01)

(58) Field of Classification Search
None
See application file for complete search history.

(56) References Cited

U.S. PATENT DOCUMENTS

| | | | |
|---|---|---|---|
| 2003/0082429 A1* | 5/2003 | Nishimura et al. | 429/35 |
| 2008/0113243 A1* | 5/2008 | Kawashima et al. | 429/32 |
| 2009/0246592 A1* | 10/2009 | Kinoshita | 429/33 |
| 2009/0269641 A1* | 10/2009 | Harada | 429/30 |
| 2012/0244452 A1 | 9/2012 | Jiang et al. | |

OTHER PUBLICATIONS

Rosato et al. ("Reinforced Plastics Handbook", Third Edition, 2005, ISBN: 978-1-85617-450-3, p. 37).*

* cited by examiner

*Primary Examiner* — Sarah A Slifka
*Assistant Examiner* — Wojciech Haske
(74) *Attorney, Agent, or Firm* — Brooks Kushman P.C.

(57) ABSTRACT

A fuel cell includes a proton exchange membrane having a first major side and a second major side. The membrane electrode assembly includes a first anisotropic reinforced layer having a first plurality of fiber preferentially oriented along a first direction, a second anisotropic reinforced layer having a second plurality of fiber preferentially oriented along a second direction, and a polymeric layer including a plurality of sulfonic acid groups. A cathode catalyst layer is disposed over the first major side of the proton exchange membrane while an anode catalyst layer is disposed over the second major side of the proton exchange membrane. An anode flow field plate is disposed over the anode catalyst layer and a cathode flow field plate is disposed over the cathode catalyst layer.

12 Claims, 10 Drawing Sheets

FUEL CELL DURABILITY BY ORTHOGONALLY ORIENTED ANISOTROPIC EXTERNAL REINFORCE LAYERS

FIELD OF THE INVENTION

In at least one aspect, the present invention relates to proton exchange membranes for fuel cells.

BACKGROUND

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM") to provide ion transport between the anode and cathode.

In proton exchange membrane type fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel and oxidant to disperse over the surface of the membrane facing the fuel- and oxidant-supply electrodes, respectively. Each electrode has finely divided catalyst particles (for example, platinum particles) supported on carbon particles to promote oxidation of hydrogen at the anode and reduction of oxygen at the cathode. Protons flow from the anode through the ionically conductive polymer membrane to the cathode where they combine with oxygen to form water which is discharged from the cell. The MEA is sandwiched between a pair of porous gas diffusion layers ("GDL") which, in turn, are sandwiched between a pair of non-porous, electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cell stacks in order to provide high levels of electrical power.

One method of forming an MEA involves depositing an electrode ink on the PEM by direct spraying or coating in a shim frame. The electrode can be formed on a decal and transferred to the PEM to form the catalyst coated membrane (CCM). Alternatively, the catalyst/ionomer ink can be coated on a gas diffusion medium (GDM) substrate, which is known as a catalyst coated diffusion media (CCDM).

Electrode inks typically include a powder catalyst on a support, such as a carbon support, and an ionomer solution which is dispersed in a mixed solvent. The mixed solvent usually contains one or more organic solvents, such as alcohols, and water in a specific ratio that depends on the type of catalyst. The mixture is then homogenized by ball-milling for up to about 3 days before coating on the PEM, decal substrate, or GDM. For shim coating, the catalyst loading can be controlled by the thickness of the shim; for the Mayer wire-wound rod coating, the catalyst loading can be controlled by the wire number. Multiple coatings can be applied for higher catalyst loading, as needed. After applying the wet ink, the solvents are dried in an oven to drive off the solvent and form the electrode. After the catalyst/ionomer coated decal dries, the catalyst/ionomer is then transferred onto a PEM by hot press to form an MEA. The anode and cathode can be hot-pressed onto a PEM simultaneously. The pressure and time for the hot press may vary for different types of MEAs.

Although the prior art method for making fuel cell MEAs works reasonably well, these assemblies still suffer from a number of problems. For example, the prior art MEAs tend to crack at a higher frequency than desired. Moreover, improvements in durability are desired to improve costs and customer acceptance.

Accordingly, there is a need for improved fuel cell membrane electrode assemblies.

SUMMARY OF THE INVENTION

The present invention solves one or more problems of the prior art by providing a fuel cell having an anisotropic reinforced layer. The fuel cell includes a membrane electrode assembly which has a first anisotropic reinforced layer having a first plurality of fibers preferentially oriented along a first average direction, a second anisotropic reinforced layer having a second plurality of fibers preferentially oriented along a second average direction, a proton exchange layer, a cathode catalyst layer, and an anode catalyst layer. Characteristically, the first average direction is different than the second average direction. The fuel cell also includes an anode flow field plate disposed over the anode catalyst layer and a cathode flow field plate disposed over the cathode catalyst layer.

In another embodiment, an assembly for a fuel cell is provided. The assembly includes a first anisotropic reinforced layer having a first plurality of fibers preferentially oriented along a first average direction and a second anisotropic reinforced layer having a second plurality of fibers preferentially oriented along a second average direction. The first average direction is different than the second average direction. A proton exchange layer is interposed between the first anisotropic reinforced layer and the second anisotropic reinforced layer. A cathode catalyst layer is interposed between the first anisotropic reinforced layer and the proton exchange layer. An anode catalyst layer is interposed between the second anisotropic reinforced layer and the proton exchange layer.

In yet another embodiment, an assembly for a fuel cell is provided. The assembly includes a first anisotropic reinforced layer having a first plurality of fibers preferentially oriented along a first average direction and a second anisotropic reinforced layer having a second plurality of fibers preferentially oriented along a second average direction. The first average direction is different than the second average direction. A first catalyst layer is disposed over a surface of the first anisotropic reinforced layer. The assembly further includes a second catalyst layer and a proton exchange layer interposed between the first catalyst layer and the second catalyst layer. When the first catalyst layer is an anode catalyst layer, the second catalyst layer is a cathode catalyst layer; and when the first catalyst layer is a cathode catalyst layer, the second catalyst layer is an anode catalyst layer.

BRIEF DESCRIPTION OF THE DRAWINGS

Exemplary embodiments of the present invention will become more fully understood from the detailed description and the accompanying drawings, wherein.

DESCRIPTION OF THE INVENTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Figure 1:
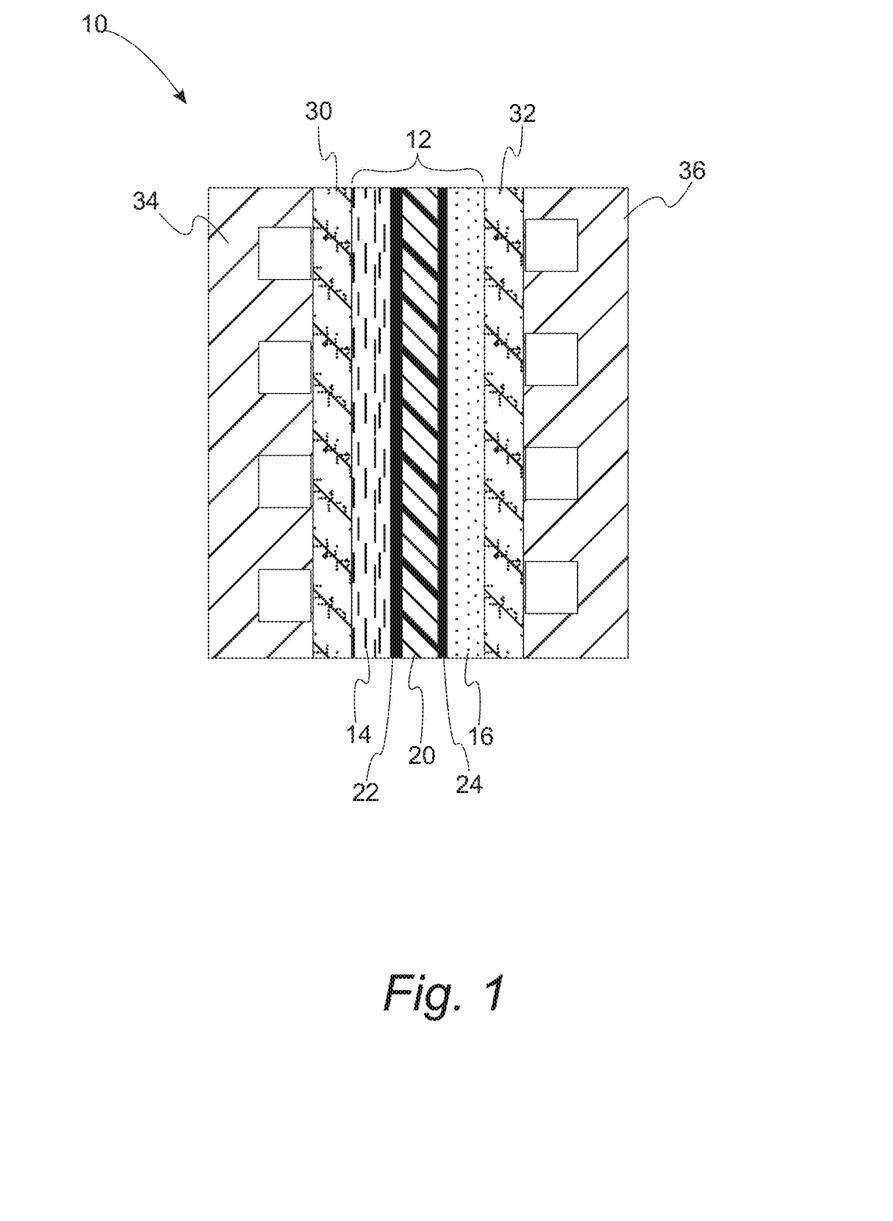
FIG. 1 is a schematic illustration of a fuel cell that incorporates a PEM with reinforced anisotropic layers.

With reference to FIG. 1, a fuel cell having an anisotropic reinforced layer is provided. Fuel cell 10 includes membrane electrode assembly 12. Membrane electrode assembly 12 includes first anisotropic reinforced layer 14 which has a first plurality of fibers preferentially oriented along a first average direction $d_1$. Membrane electrode assembly 12 includes second anisotropic reinforced layer 16 which has a second plurality of fibers preferentially oriented along a second average direction $d_2$. Membrane electrode assembly 12 also includes proton exchange layer 20, anode catalyst layer 22, and cathode catalyst layer 24. The thickness of anode and cathode catalyst layers is in the range of 1-50 μm. Characteristically, the first average direction $d_1$ is different than the second average direction $d_2$. In a variation, fuel cell 10 also includes gas diffusion layers 30 and 32. In yet another variation, fuel cell 10 includes anode flow field plate 34 disposed over gas diffusion layer 30 and anode catalyst layer 22, and cathode flow field plate 36 disposed over gas diffusion layer 32 and cathode catalyst layer 24.

Figure 2:
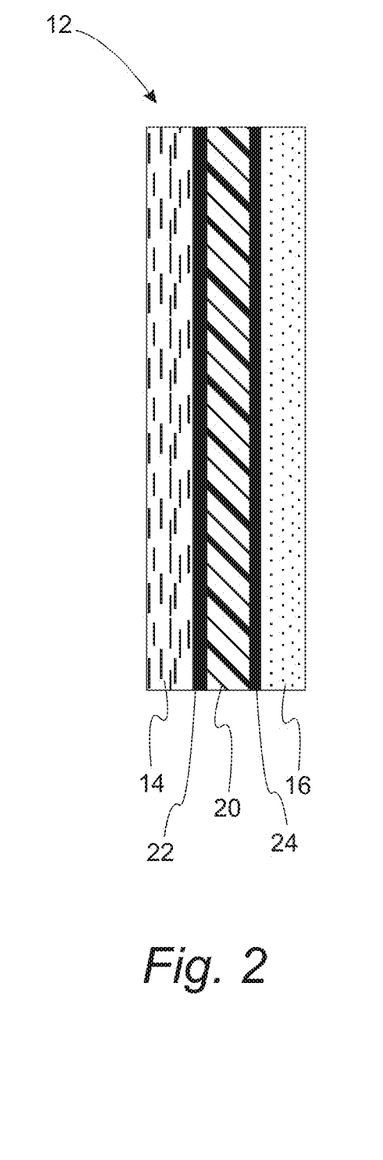
FIG. 2 is a schematic illustration of a variation of a membrane electrode assembly with anisotropic layers on opposite sides of a PEM.

With reference to FIG. 2, a schematic illustration of a variation of a membrane electrode assembly is provided. In this variation, membrane electrode assembly 12 is arranged with the proton exchange layer 20 interposed between first anisotropic reinforced layer 14 and second anisotropic reinforced layer 16. Moreover, anode layer 22 is interposed between first anisotropic reinforced layer 14 and proton exchange layer 20, and cathode catalyst layer 24 is interposed between second anisotropic reinforced layer 16 and proton exchange layer 20. A membrane electrode assembly with external reinforced layers made in this way demonstrates reduced membrane buckling and improved fuel cell durability.

Figure 3:
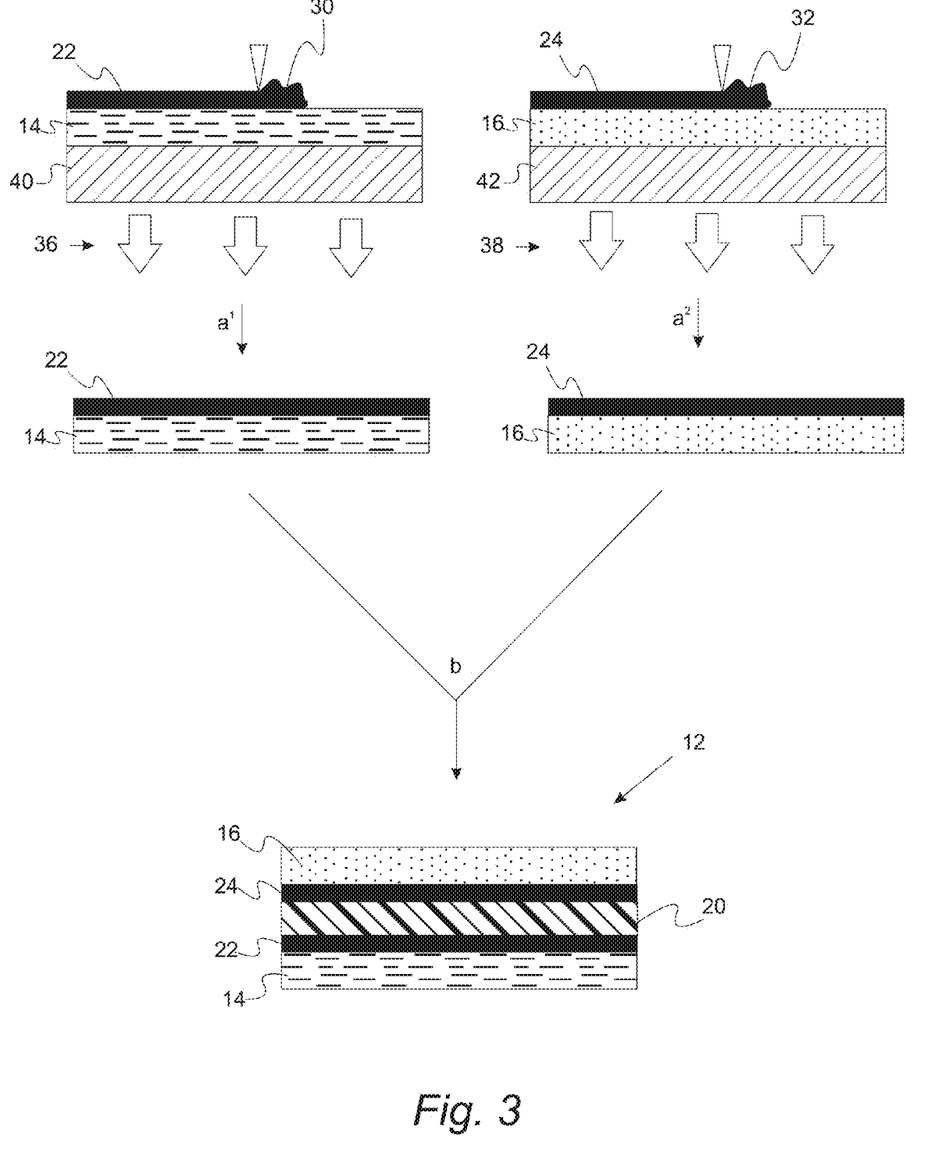
FIG. 3 is a schematic flowchart illustrating the preparation of the membrane electrode assembly of FIG. 2.

With reference to FIG. 3, a schematic flowchart illustrating the preparation of the membrane electrode assembly of FIG. 2 is provided. In steps $a^1$) and $a^2$), a catalyst layer is coated onto first anisotropic reinforced layer 14 and second anisotropic reinforced layer 16. In step $a^1$), anode catalyst layer 22 is coated onto first anisotropic reinforced layer 14 from coating composition 30. In step $a^2$), cathode catalyst layer 24 is coated onto second anisotropic reinforced layer 16 from coating composition 32. In step b), membrane electrode assembly 12 is assembled by contacting proton exchange layer 20 with anode catalyst layer 22 coated on first anisotropic reinforced layer 14 and cathode catalyst layer 24 coated on second anisotropic reinforced layer 16 with the catalyst layers being positioned at opposite sides of proton exchange layer 20. Suitable anisotropic reinforced layers are commercially available from W. L. Gore & Associate (Gore), of Maryland, under the designation CARBEL® MP30Z. The reinforced layers normally contain electrically conductive materials (e.g., carbon powders) and other support material (e.g., hydrophobic fluoropolymers). Unlike the microporous layers typically used on the gas diffusion media, the reinforced layers hold together without any extra substrate. In a variation, the reinforced layers include a plurality of fibers. Examples of suitable fibers include, but are not limited to, polymeric fibers (e.g., ePTFE (expanded polytetrafluorethylene) fibers), inorganic fibers, and the like, and combinations thereof.

Coating compositions 30 and 32 typically contain a catalyst and a proton conductive ionomer in a solvent. Suitable solvents include, but are not limited to, one or more of water, alcohol, and the like. Moreover, coating compositions may optionally include other organic additives. To achieve a smooth catalyst coating surface and control mud-cracking, additives, such as carbon nanofiber, can be added to the coating material.

The catalyst layers can be coated on the reinforced layers in a shim frame to a predetermined thickness. The use of the shim frame makes it easier to obtain uniform catalyst loadings and is controlled by the thickness of the shim. In a refinement, vacuum 36 holds first anisotropic reinforced layer 14 to coating plate 40 while vacuum 38 holds second anisotropic reinforced layer 16 to coating plate 42. The shim frame can be made of a material which is dimensionally stable and which does not interact with any of the components of the electrode ink. High quality shim materials with uniform thickness are commercially available. Suitable materials include, but are not limited to, polyimide film (e.g., DuPont Kapton®), polyethylene naphthalate film (PEN) (e.g., DuPont Teonex®), ethylene tetrafluoroethylene (ETFE), stainless steel, and the like.

Figure 4:
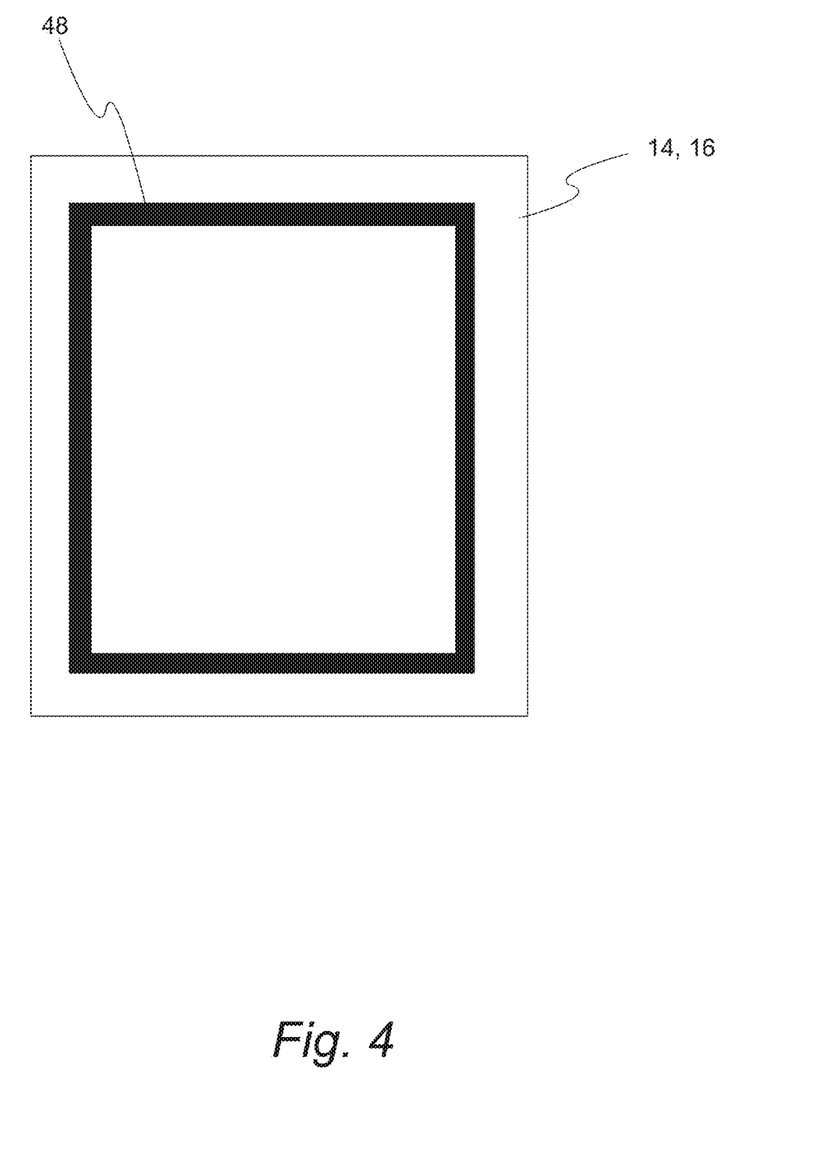
FIG. 4 provides a top view of a shim frame being placed on a reinforced layer.

With reference to FIGS. 3 and 4, a variation of a coating process used to form the catalyst layers is provided. FIG. 4 provides a top view of a shim frame being placed on either reinforced layers 14 and 16. Shim frame 48 has a predetermined thickness and is placed on either first anisotropic reinforced layer 14 and/or second anisotropic reinforced layer 16. The reinforced layer is placed on the flat surface of either coating plate 40 or 42. The coating plates typically have a porous structure (e.g., graphite plate). A vacuum (items numbers 36, 38) is applied at the bottom of the graphite plate to hold the reinforced layers in place. The coating composition (item numbers 30 or 32) is initially placed on the shim frame without contacting the reinforced layer. A brush/slide bar is then slid through the coating material to cover the whole area of the reinforced layer. The thickness of each pass of coating is determined by the thickness of the shim film and the amount of solid materials (e.g., catalyst, ionomer) contained in the catalyst coating composition. The catalyst coated reinforced layer is then dried at a temperature typically between 100 to 500° F. for 15 to 20 minutes. This coating process can be repeated as needed to obtain the catalyst thickness required. Advantageously, the coated catalyst layers on the reinforced layers have a smooth surface without any visible mud-cracking or wrinkling.

The catalyst coated reinforced layers are bonded on both sides of the proton exchange membrane by placing the catalyst coated reinforced layers on opposites side with differing relative orientations (e.g., orthogonal). The reinforced layers and membrane are placed under a pressure of about 100-300 psi compression pressure and a temperature of about 200-400° F. The resulting MEA has two reinforcement layers with differing orientations. Advantageously, extra support is provided to the proton exchange layer with reduced membrane buckling and improved fuel cell durability.

The MEA can optionally include a subgasket positioned between the PEM and the catalyst coated reinforced layer on one or both sides. The subgasket has the shape of a frame, and the size of the window is smaller than the size of the catalyst coated reinforced layer and the size of the PEM.

Figure 5:
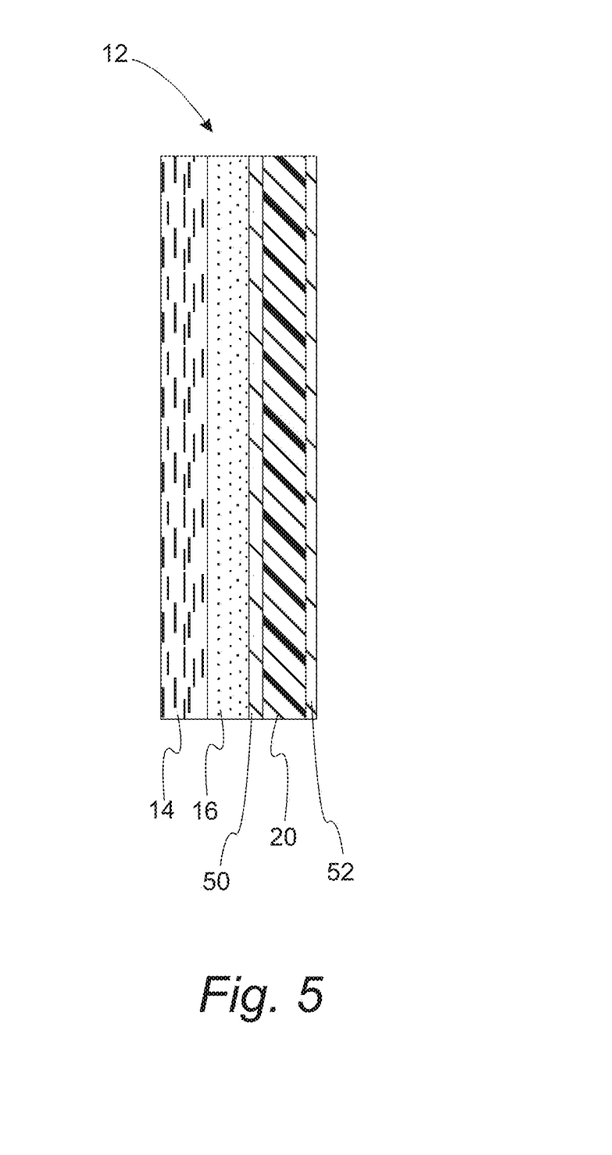
FIG. 5 is a schematic illustration of a variation of a membrane electrode assembly with two anisotropic layers positioned on the same sides of a PEM.

With reference to FIG. 5, a schematic illustration of a variation of a membrane electrode assembly is provided. In this variation, membrane electrode assembly 12 is arranged with second anisotropic reinforced layer 16 interposed between first anisotropic reinforced layer 14 and proton exchange layer 20. Catalyst layer 50 is interposed between second anisotropic reinforced layer 16 and proton exchange layer 20 while catalyst layer 52 is disposed over proton exchange layer 20. Catalyst layer 50 and catalyst layer 52 contact opposite sides of proton exchange layer 20. When first catalyst layer 50 is an anode catalyst layer, second catalyst layer 52 is a cathode layer, and when first catalyst layer 50 is a cathode catalyst layer, second catalyst layer 52 is an anode layer.

Figure 6:
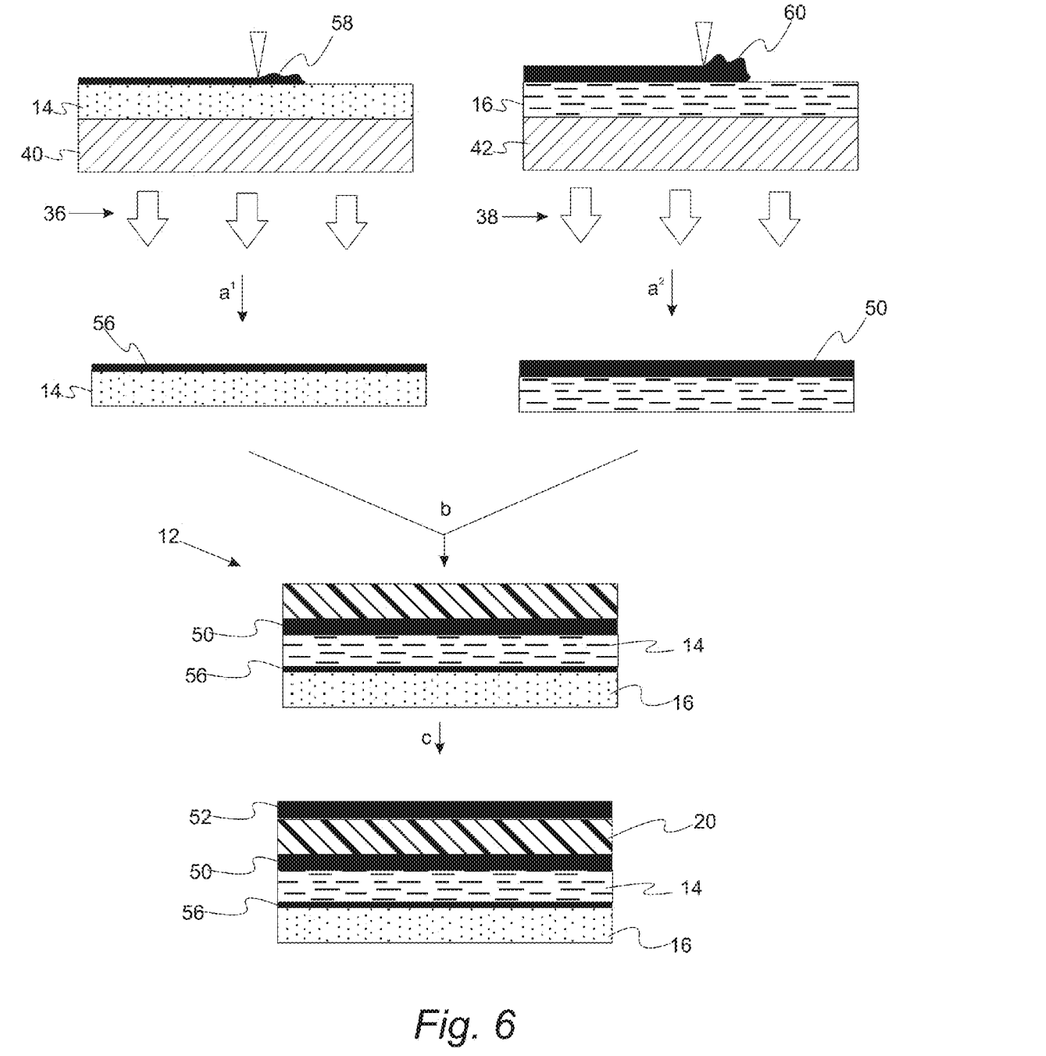
FIG. 6 is a schematic flowchart illustrating the preparation of the membrane electrode assembly of FIG. 5.

With reference to FIG. 6, a schematic flowchart illustrating the preparation of the membrane electrode assembly of FIG. 5 is provided. In steps $a^1$) and $a^2$), a catalyst layer is coated onto first anisotropic reinforced layer 14 and second anisotropic reinforced layer 16. In step $a^1$), carbon layer 56 is coated onto first anisotropic reinforced layer 14 from coating composition 58. In a refinement, carbon layer 56 includes PTFE. In another refinement, carbon layer 56 has a thickness from about 1 to 10 microns. In step $a^2$), catalyst layer 50 is coated onto second anisotropic reinforced layer 16 from coating composition 60. In a refinement, vacuum 36 holds first anisotropic reinforced layer 14 to coating plate 40 while vacuum 38 holds second anisotropic reinforced layer 16 to coating plate 42. In step b), proton exchange layer 20 is contacted with catalyst layer 50 and carbon layer 56 is contacted with second anisotropic reinforced layer 16. Catalyst layer 50 and carbon layer 56 are positioned on opposite sides of second anisotropic reinforced layer 16. Suitable anisotropic reinforced layers are the same as those set forth above. In a refinement, first anisotropic layer 14 is bonded to second anisotropic layer 16 such that the orientation of the fibers in each layer are different. In a further refinement, first anisotropic layer 14 is bonded to second anisotropic layer 16 and are hot pressed together at about 100-300 psi compression pressure and a temperature of about 200-400° F. The obtained double layer bonded reinforced layers are then hot pressed on one surface of the proton exchange membrane using the similar conditions. In step c), catalyst layer 52 is coated onto proton exchange layer 20.

Figure 7A:
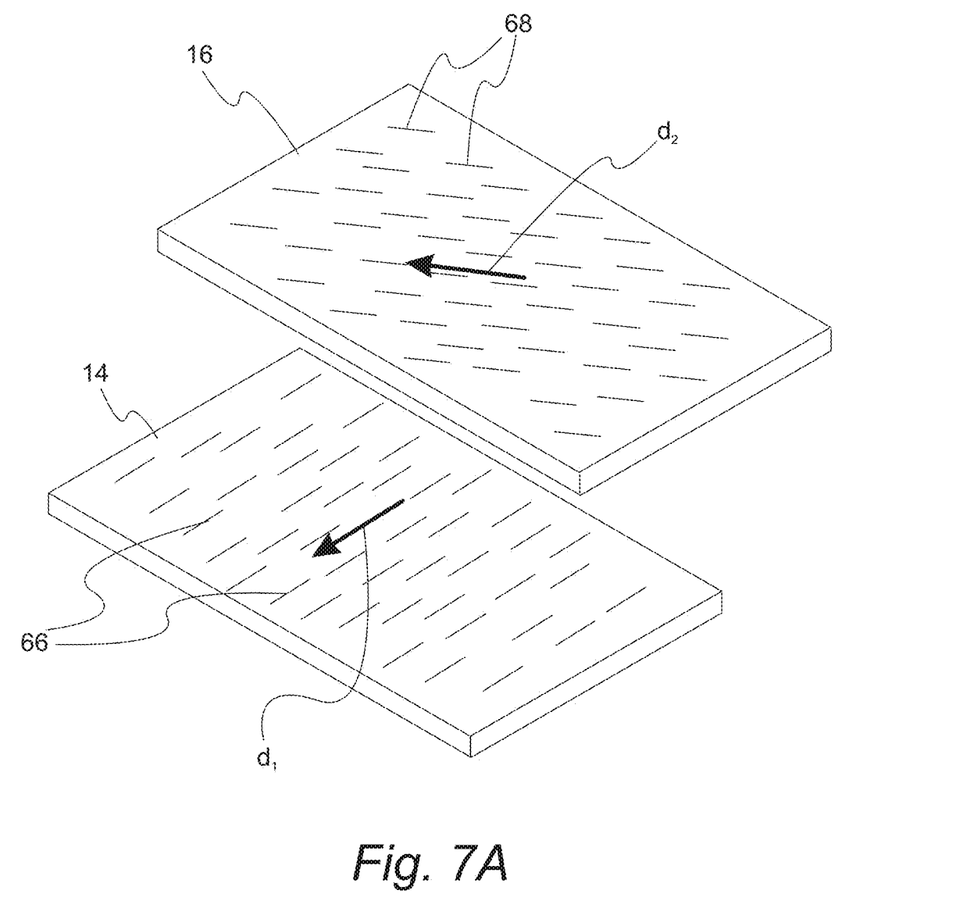
FIG. 7A is a perspective view showing the relative positioning of two anisotropic reinforced layers.
Figure 7B:
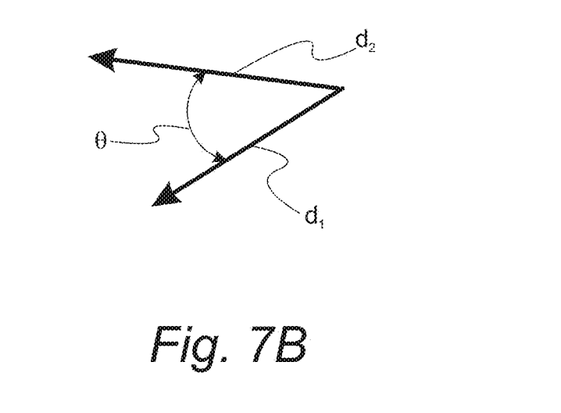
FIG. 7B is an illustration of the relative orientation of the average direction of the fibers for two anisotropic reinforced layers.

In the embodiments set forth above, first anisotropic layer 14 is bonded to second anisotropic layer 16 with each layer having its fiber oriented in a different average direction. FIG. 7A provides a perspective view illustrating the orientation of the fibers in differing average directions. First anisotropic layer 14 includes fibers 66 having an average orientation along average direction $d_1$. Second anisotropic layer 16 includes fibers 68 having an average orientation along average direction $d_2$. FIG. 7B provides a schematic showing the relative orientation of average directions $d_1$ and $d_2$. FIG. 7B shows that $d_1$ and $d_2$ are oriented with an average angle of θ. Angle θ can be virtually any angle. In a variation, angle θ is from about 5 degrees to 90 degrees. When θ is 90 degrees, first anisotropic reinforced layer 14 and second anisotropic layer 16 are orthogonal.

The following examples illustrate the various embodiments of the present invention. Those skilled in the art will recognize many variations that are within the spirit of the present invention and scope of the claims.

Comparative Example 1

A regular catalyst coated membrane ("CCM") MEA was made according to a decal transfer method. A catalyst solution containing Pt/VULCAN® (carbon) catalyst with a loading of 0.4 mg Pt/cm² was coated on ETFE decals. After drying, the catalyst layers were transferred from the ETFE decals onto both sides of a PEM by a hot press method at a temperature of 295° F., and 200 psi compression pressure to form a catalyst coated membrane.

The CCM was then placed between a pair of diffusion media together with other parts including gas flow field plates, current collector and end plates, to form a fuel cell.

Comparative Example 2

A regular catalyst coated diffusion media ("CCDM") MEA was made by using two pieces of catalyst coated diffusion media bonded with a PEM. Carbon paper substrate with micro porous layer (MPL) was used as the gas diffusion media. A catalyst solution containing Pt/VULCAN® catalyst with a loading of 0.4 mg Pt/cm² was coated on gas diffusion media. After drying, the two pieces of catalyst coated diffusion media were bonded onto both sides of a PEM by a hot press method at a temperature of 295° F., and 200 psi compression pressure to form a CCDM.

The CCDM was then placed between other parts including gas flow field plates, current collector and end plates, to form a fuel cell.

Example 1

A MEA was made according to the method set forth in FIGS. 2 and 3. A catalyst solution containing Pt/VULCAN® catalyst, with a loading of 0.4 mg Pt/cm², was coated onto a reinforced layer (CARBEL® MP30Z from Gore).

Two catalyst coated reinforced layers placed in orthogonal orientation were then bonded to a PEM by a hot press method at a temperature of 295° F., and 200 psi compression pressure to form a reinforced MEA.

The MEA was then placed between a pair of diffusion media and other parts including gas diffusion media gas flow field plates, current collector and end plates, to form a single fuel cell.

Tests

Figure 8:
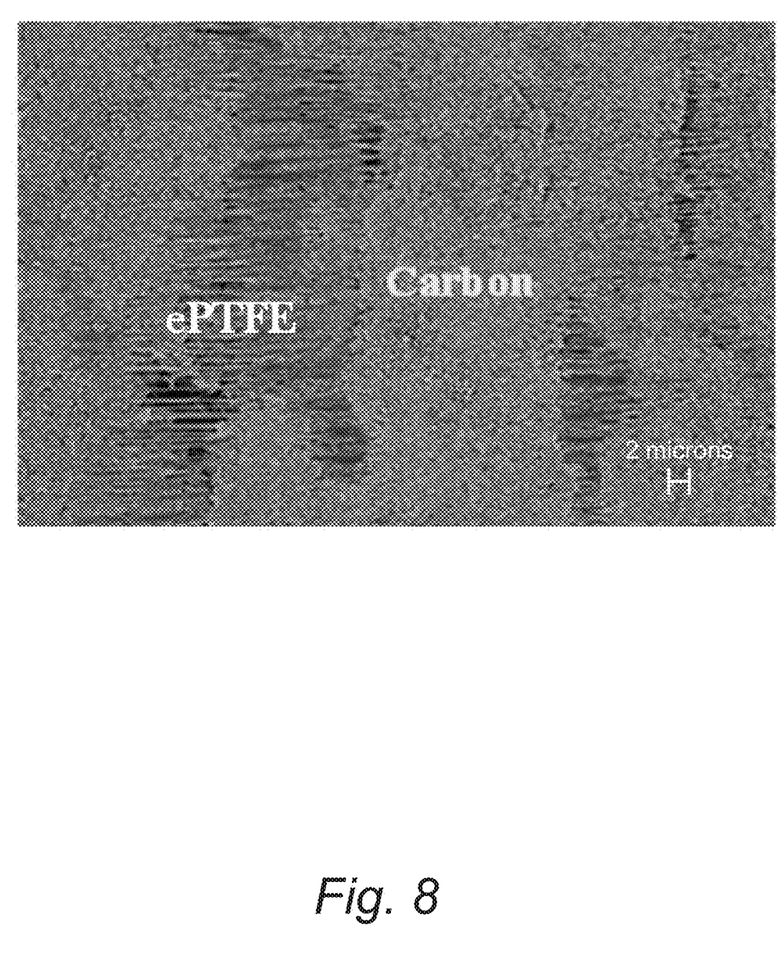
FIG. 8 is a scanning electron micrograph of an anisotropic reinforced layer.

The scanning electron microscopy (SEM) top down image was taken on the surface of the CARBEL® MP30Z, a ~50 μm film containing ePTFE support and carbon, as an example of an anisotropic reinforced layer. This anisotropic reinforced layer has an anisotropic morphology structure such that ePTFE fibers are oriented along a certain direction as shown in FIG. 8.

Figure 9:
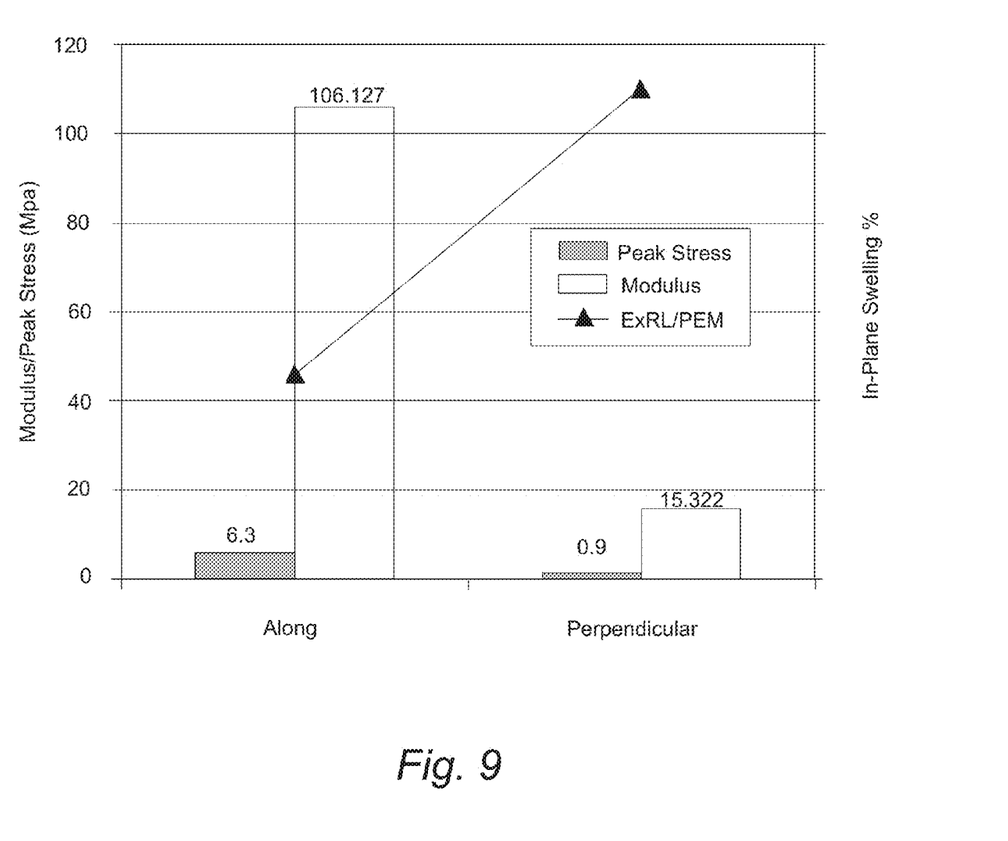
FIG. 9 provides modulus and stress data for an anisotropic reinforced layer; and the in-plane swelling of a PEM bonded with an anisotropic reinforced layer.

The modulus and peak stress data were obtained from stress-strain tensile test. FIG. 9 provides the modulus and stress analysis. The anisotropic structure of this anisotropic reinforced layer (CARBEL® MP30Z) affects its anisotropic mechanical properties: the modulus and peak stress in one direction along with the ePTFE fiber are significantly higher than that perpendicular to the fiber direction. A PEM bonded with one piece of electrode layer coated anisotropic reinforced layer (with the electrode layer contacted to one surface of PEM) was prepared to test the dimensional stability of the anisotropic reinforced layer/PEM material (named as ExRL/PEM in FIG. 9). The anisotropic reinforced layer/PEM has more swelling in the direction perpendicular to the fiber direction than that along the fiber direction, which means worse dimension stability perpendicular to the fiber direction, than along the fiber direction.

Figure 10:
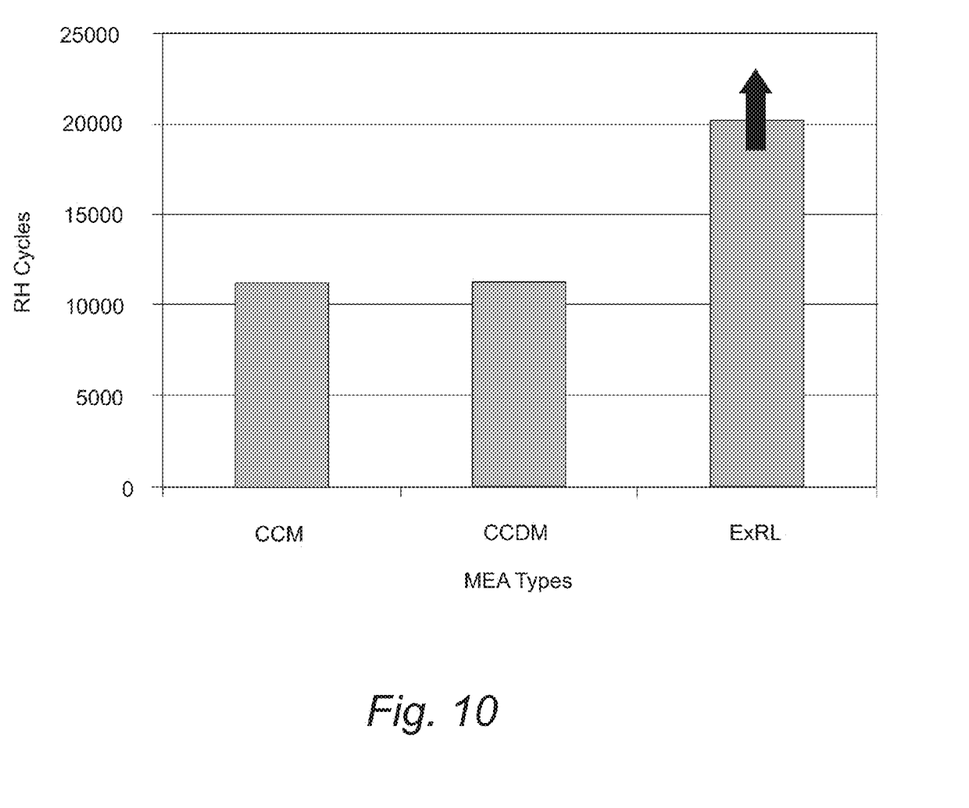
FIG. 10 provides a bar chart summarizing durability testing of a conventional MEA and a MEA having anisotropic reinforced layers.

The fuel cells of Comparative Example 1 (CCM), Comparative Example 2 (CCDM) and Example 1 were tested for fuel cell durability by relative humidity (RH) cycling. The results of the durability testing are presented in FIG. 10. The testing conditions were: Cell Build: 50 cm² cell with 2 mm lands and 2 mm straight channels flow field; Cycle: 2 min 150% RH H₂/air; 2 min 0% RH H₂/air flow; Conditions: 80° C., 0 kPa gauge pressure, 20 SLPM anode and cathode stoichiometries, counter-flow; Diagnostics: Physical crossover leak (failure=10 sccm) under air/air with 3 psi gas pressure difference. The test results indicated that both of the CCM and CCDM comparative examples failed during the RH cycling tests within 11,000 cycles with over 10 sccm gas leak. While the MEA with orthogonally oriented anisotropic reinforced layers (named as ExRL) prepared in Example 1 passed the RH cycling test with over 20,000 cycles without leak.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A fuel cell comprising:
a membrane electrode assembly including a first anisotropic reinforced layer having a first plurality of fibers preferentially oriented along a first direction, a second anisotropic reinforced layer having a second plurality of fibers preferentially oriented along a second direction, the first anisotropic reinforced layer and the second anisotropic reinforced layer each independently including a support material, a proton exchange layer, a cathode catalyst layer, and an anode catalyst layer, the first direction being different than the second direction, the anode catalyst layer coated onto the first anisotropic reinforced layer and the cathode catalyst layer coated onto the second anisotropic reinforced layer, the proton exchange layer interposed between and contacting the anode catalyst layer and the cathode catalyst layer;
a first diffusion layer disposed over the cathode catalyst layer;
a second diffusion layer disposed over the anode catalyst layer;
an anode flow field plate disposed over the second diffusion layer; and
a cathode flow field plate disposed over the first diffusion layer.

2. The fuel cell of claim 1 wherein the first direction is substantially orthogonal to the second direction.

3. The fuel cell of claim 1 wherein the first anisotropic reinforced layer and the second anisotropic reinforced layer each independently include an electrically conductive filler.

4. The fuel cell of claim 3 wherein the electrically conductive filler includes a component selected from the group consisting of carbon powder, carbon fibers, and combinations thereof and the support material comprises a component selected from the group consisting of hydrophobic fluoropolymers and copolymers thereof.

5. The fuel cell of claim 1 wherein the first plurality of fibers and the second plurality of fibers each independently comprise a component selected from the group consisting of polymeric fibers, inorganic fibers, and combinations thereof.

6. The fuel cell of claim 1 wherein the proton exchange layer contacts the cathode catalyst layer and the anode catalyst layer.

7. The fuel cell of claim 1 wherein the first direction is parallel to a surface of the first anisotropic reinforced layer and the second direction has a component parallel to a surface of the second anisotropic reinforced layer.

8. An assembly for a fuel cell, the assembly comprising:
a first anisotropic reinforced layer having a first plurality of fibers preferentially oriented along a first direction;
a second anisotropic reinforced layer having a second plurality of fibers preferentially oriented along a second direction, the first direction being different than the second direction;
a proton exchange layer interposed between the first anisotropic reinforced layer and the second anisotropic reinforced layer, the first anisotropic reinforced layer and the second anisotropic reinforced layer each independently including a support material;
a cathode catalyst layer interposed between the first anisotropic reinforced layer and the proton exchange layer, the cathode catalyst layer coated onto the first anisotropic layer;
an anode catalyst layer interposed between the second anisotropic reinforced layer and the proton exchange layer, the anode catalyst layer coated onto the second anisotropic reinforced layer;
a first diffusion layer disposed over the cathode catalyst layer; and
a second diffusion layer disposed over the anode catalyst layer.

9. The assembly of claim 8 wherein the first direction is substantially orthogonal to the second direction.

10. The assembly of claim 8 wherein the first anisotropic reinforced layer and the second anisotropic reinforced layer each independently include an electrically conductive filler.

11. The assembly of claim 10 wherein the electrically conductive filler includes a component selected from the group consisting of carbon powder, carbon fibers, and combinations thereof and the support material comprises a component selected from the group consisting of hydrophobic fluoropolymers and copolymers thereof.

12. The assembly of claim 8 wherein the first plurality of fibers and the second plurality of fibers each independently include a component selected from the group consisting of polymeric fibers, inorganic fibers, and combinations thereof.

* * * * *